Figure 1:
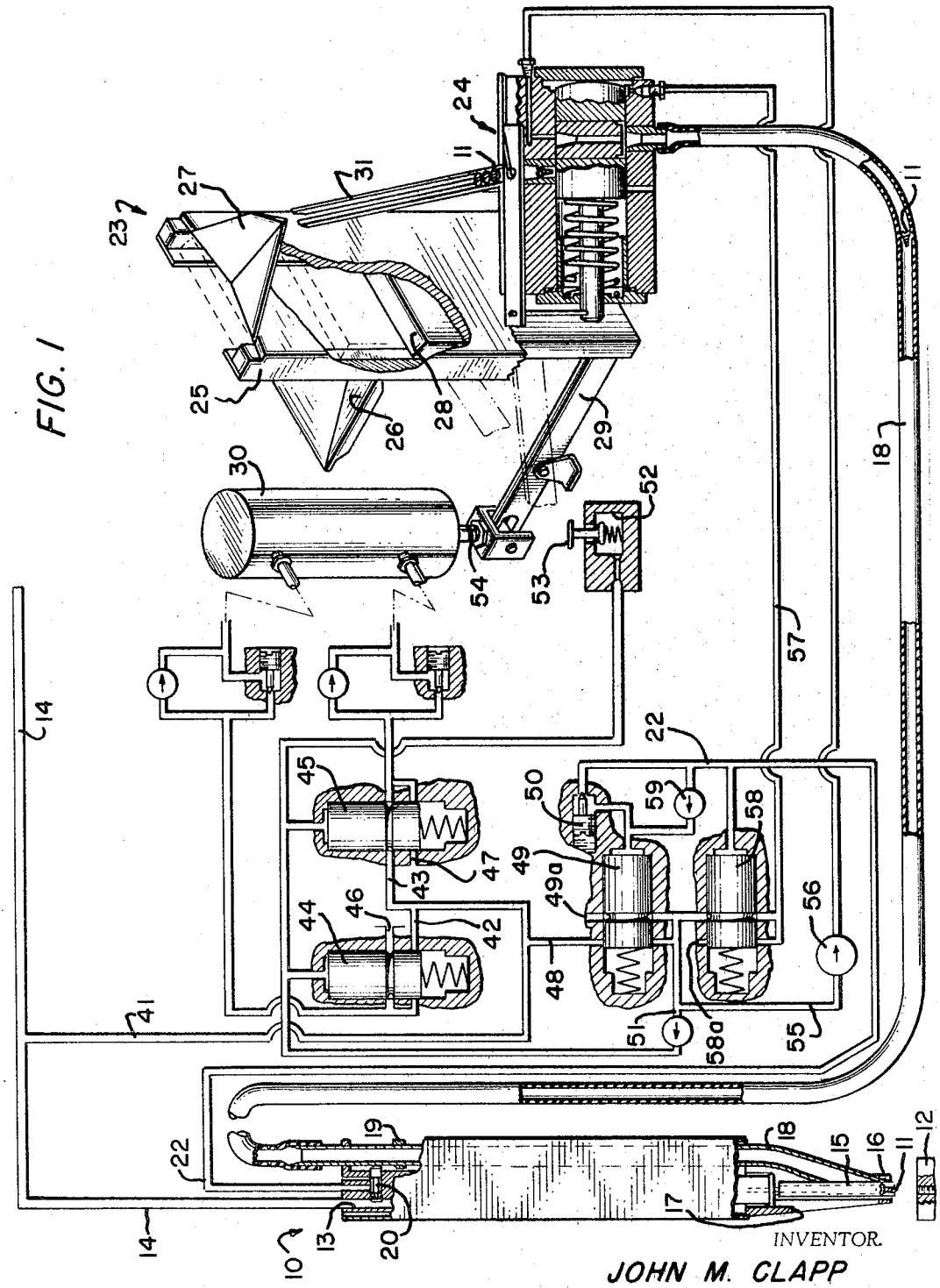

INVENTOR.
JOHN M. CLAPP

INVENTOR.
JOHN M. CLAPP

United States Patent Office 3,301,284
Patented Jan. 31, 1967

3,301,284
APPARATUS FOR SUPPLYING FASTENER
SHAPED PARTS
John M. Clapp, Athens, Pa., assignor to Ingersoll-Rand
Company, New York, N.Y., a corporation of New
Jersey
Filed Sept. 1, 1965, Ser. No. 484,169
12 Claims. (Cl. 144—32)

This invention relates to the provision of a new and improved apparatus for supplying fastener shaped parts such as nails, screws, ice studs, and the like to a power operated insertion tool by fluid pressure.

Conventional devices for supplying fastener shaped parts to a power operated insertion tool by fluid pressure have generally been limited to two basic types. That is, they either have employed high pressure fluid to supply the parts or, alternatively, they have used lower pressure fluid to supply each part after the preceding one thereof has been driven to depth or torque by the insertion tool.

The use of high pressure fluid to supply the parts to the insertion tool is, however, dangerous in the event that the part delivery conduit breaks or becomes detached from the insertion tool as a conventional high delivery pressure of 90 p.s.i.g. can drive the parts at velocities in excess of 50 miles per hour. This use of high pressure fluid, furthermore, causes greatly increased wear on the insertion tool and damage to the parts being supplied thereto due to the high velocity at which the parts are supplied. The use of lower pressure fluid to accomplish slow speed delivery of the parts after each preceding one has been driven to depth or torque overcomes these disadvantages arising from the use of high pressure fluid, but unduly prolongs the operating cycle of the insertion tool and results in a slow down in its production.

The principal object of the present invention is to provide a new and improved apparatus for supplying fastener shaped parts to a power operated insertion tool by fluid pressure, which apparatus is constructed and arranged to provide the advantages arising from the use of both high and low pressure fluid without the disadvantages of either thereof.

This object and those other objects of the invention which will be apparent from the following description taken in connection with the accompanying drawings are obtained by the present invention through the transfer of the parts to a position towards, and preferably adjacent, the power insertion tool by low pressure fluid and from such position towards the insertion tool into the insertion tool by higher pressure fluid.

Figure 2:
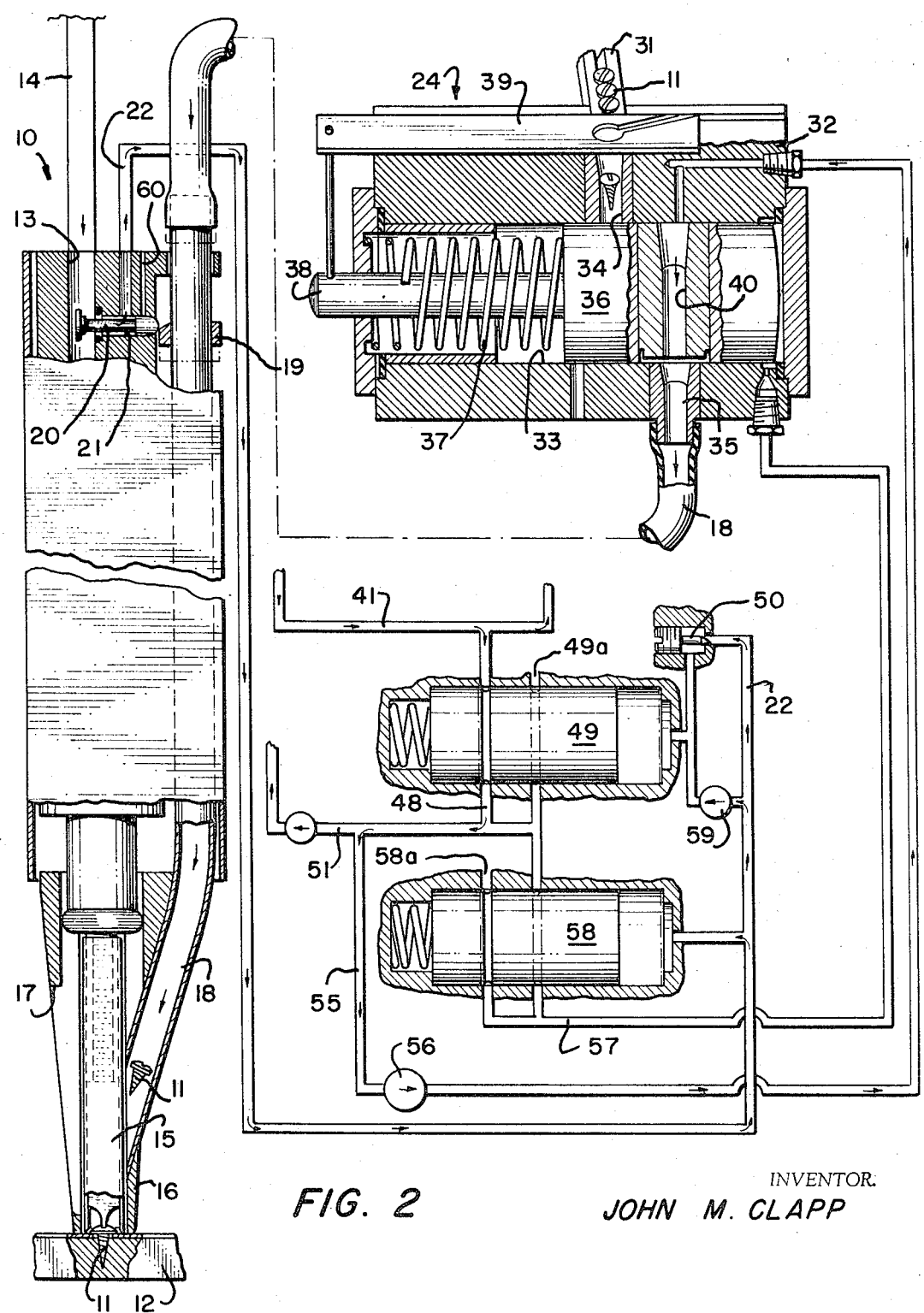
Figure 3:
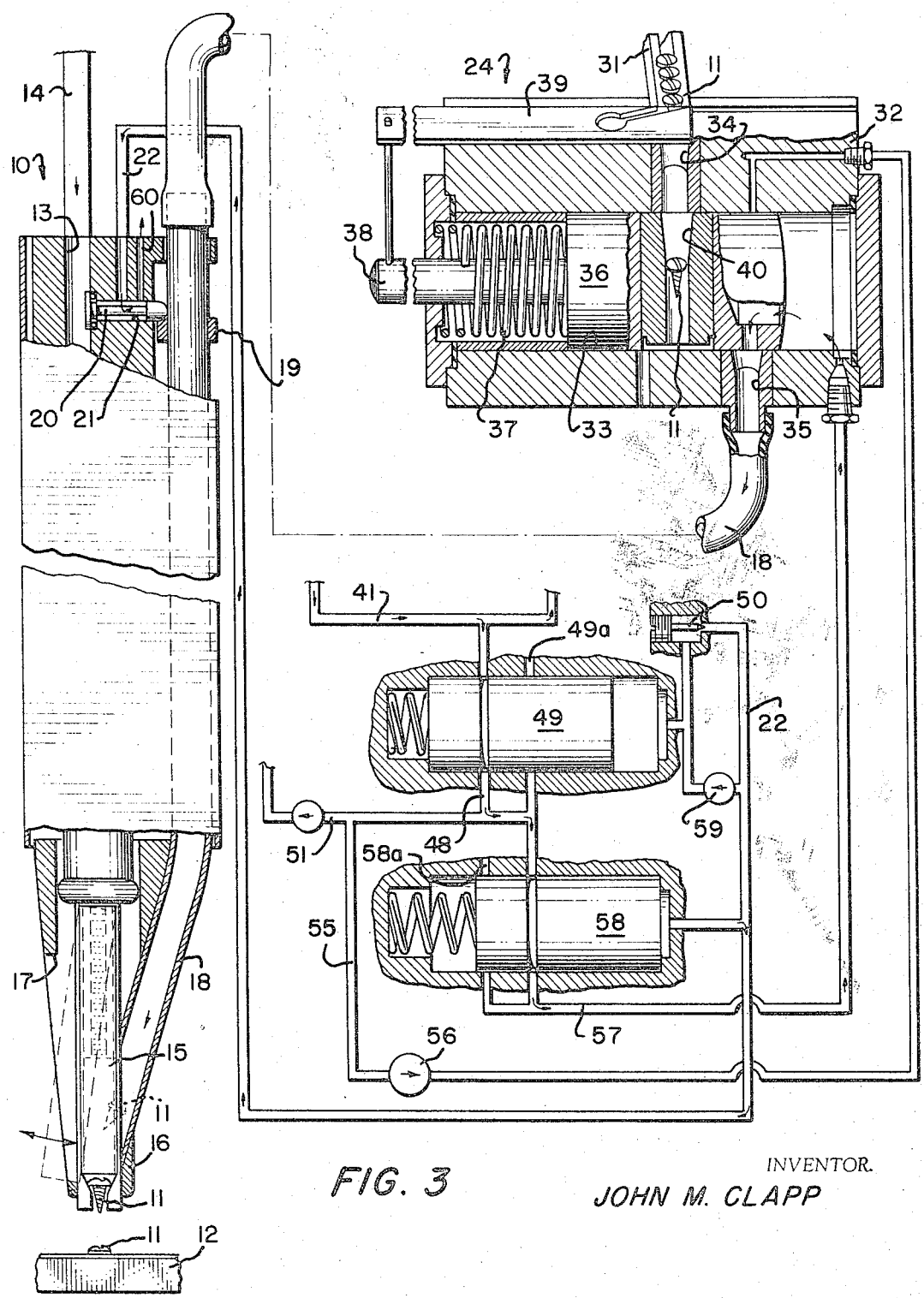

Referring to the drawings wherein the invention has been shown for the purposes of illustration only, as adapted for supplying screws to a pneumatic screwdriver:

FIG. 1 is a schematic view illustrating an embodiment of the invention in combination with a screw storage and feeding apparatus and a pneumatic screwdriver;

FIG. 2 is an enlarged, fragmentary schematic view of the embodiment of the invention illustrated in FIG. 1 showing such with a screw supplied to a position adjacent the pneumatic screwdriver; and FIG. 3 is an enlarged, fragmentary schematic view generally similar to FIG. 2, but showing the invention delivering the screw from such position adjacent the pneumatic screwdriver into the pneumatic screwdriver.

Referring more particularly to the drawings wherein similar reference characters designate corresponding parts throughout the several views, FIG. 1 illustrates a pneumatic screwdriver designated generally at 10 which is adapted to drive screws 11 individually into a workpiece 12. The pneumatic screwdriver 10 is powered by a pneumatic motor (not shown) which is operatively connected through a pneumatic inlet passage 13 and a pneumatic supply line 14 to a source of relatively high pressure air (not shown) adapted to continuously supply air under a pressure within the range of from 70 to 110 p.s.i.g. to the pneumatic motor.

The driving tool of the pneumatic screwdriver 10 comprises a screw engaging bit 15 which is of the type disclosed in United States patent application, Serial No. 400,998, entitled, Fastener-Feeding and Holding Mechanism for Power-Driven Insertion Tools, filed October 2, 1964, by Otmar M. Ulbing and assigned to the assignee of the present invention. The screw engaging bit 15 is axially movable relative to the pneumatics motor of the pneumatic screwdriver 10 to be urged into driven relationship with the pneumatic motor upon engagement of a driven screw 11 with the workpiece 12. The screw engaging bit 15, furthermore, is laterally movable relative to the pneumatic motor as disclosed in the before-identified patent application. The screw holding jaws 16 of the pneumatic screwdriver 10 include a slot 17 adapted to permit the lateral movement of the screw engaging bit 15 and are longitudinally slidable relative to the screw engaging bit 15 to be longitudinally displaced upon contact with the workpiece 12 while the pneumatic screwdriver 10 is driving a screw 11 to depth.

A screw delivery conduit 18 is connected to the pneumatic screwdriver 10 for supplying the screws 11 individually to the screw holding jaws 16. The screw delivery conduit 18 is adapted for longitudinal slidable movement with the screw holding jaws 16 and carries a camming member 19 adapted to open a plunger valve 20 upon longitudinal movement of the delivery conduit 18 from the workpiece 12. The plunger valve 20 is disposed within a valve chamber 21 located intermediate the pneumatic inlet passage 13 and a first pneumatic signal line 22 the function of which will be later herein described. The end of the delivery conduit 18 opposite to that connected to the pneumatic screwdriver 10 is operatively connected to a screw storage and feeding apparatus comprising a screw storage apparatus 23 and an escapement mechanism 24 adapted to provide individual feed of the screws 11 from the screw storage apparatus 23 to the delivery conduit 18.

As illustrated, the screw storage apparatus 23 comprises a vertical support 25 which carries a screw storage hopper 26 and a screw discharge chute 27 vertically above the storage hopper 26. A blade lift member 28 is slidably mounted within the vertical support 25 for movement into alternative communicating relationship with the storage hopper 26 and the discharge chute 27 to transfer the screws 11 stored in the storage hopper 26 to the discharge chute 27. The lift member 28 is connected by a pivotal linkage arm 29 to a pneumatic motor 30 to be actuated thereby to effect such transfer of the screws 11 from the storage hopper 26 to the discharge chute 27.

The discharge chute 27 declines from the vertical support 25 and communicates at its lower end with a screw raceway 31 for delivering the screws 11 to the screw raceway 31. The screw raceway 31, in turn, declines from the discharge chute 25 to gravity feed the screws 11 supplied by the discharge chute 27 to the escapement mechanism 24.

The escapement mechanism 24 comprises an escapement housing 32 having a piston chamber 33 longitudinally therein. A first screw delivery passage 34 communicates the piston chamber 33 with the screw raceway 31, a second screw delivery passage 35 communicates the piston chamber 33 with the delivery conduit 18. A pneumatically actuated piston 36 is slidably disposed within the piston chamber 33 and is returned by a spring 37.

The piston 36 carries a piston rod 38 which, in turn, carries a shuttle member 39 slidably interposed intermediate the screw raceway 31 and the first screw delivery passage 34. The shuttle member 39 is adapted to separate the leading screw 11 in the screw raceway 31 from the other screws 11 therein during each reciprocation of the piston 36 and directs the leading screw 11 into the first screw delivery passage 34. The piston 36 includes a screw delivery passage 40 adapted for alternative alignment with the first screw delivery passage 34 and the second screw delivery passage 35 during each reciprocation of the piston 36. The screw delivery passage 40 receives the individual screws 11 from the first screw delivery passage 34 and transfers such to the second screw delivery passage 35 from whence they are gravity fed to the delivery conduit 18 to complete the transfer of the screws 11 from the screw raceway 31 to the delivery conduit 18.

The illustrated embodiment of the present invention supplies motive air to the delivery conduit 18 through the escapement mechanism 24 and forms a portion of the pneumatic system for operating the beforedescribed screw storage and feeding apparatus. It will be understood, however, that this embodiment of the present invention has been given for the purposes of illustration only and that the present invention is not limited to application with the illustrated screw storage and feeding apparatus nor to the supplying of the motive air through the escapement mechanism 24. To the contrary, as will be seen from the following description, the present invention may be successfully employed with substantially any screw storage and feeding apparatus and may supply motive air to the delivery conduit 18 independently of the escapement mechanism 24 and the screw storage apparatus 23.

As illustrated, the pneumatic system for operating the escapement mechanism 24 and the screw storage apparatus 23 comprises a pneumatic supply line 41 which communicates with the pneumatic supply line 14 operatively connecting the pneumatic screwdriver 10 to the continuous source of high pressure air (not shown). The pneumatic supply line 41 is operatively connected to a pneumatic supply line 42 communicating with the pneumatic motor 30 above the piston (not shown) thereof and to a pneumatic supply line 43 communicating with the pneumatic motor 30 below the piston thereof. A pneumatically actuated or opened, spring returned or closed, control valve 44 is interposed within the pneumatic supply line 42; a spring actuated or opened, pneumatically returned or closed, control valve 45 is interposed within the pneumatic supply line 43. The control valves 44 and 45 are adapted to connect the pneumatic supply lines 42 and 43, respectively, to the exhaust lines 46 and 47, when deactuated or closed.

The pneumatic supply line 41, also, communicates with a pneumatic supply line 48 within which is disposed a pneumatically actuated or opened, spring returned or closed control valve 49. The control valve 49 communicates the pneumatic supply line 41 with a second pneumatic signal line 51 which is adapted to supply air to the control valves 44 and 45 for actuating or opening the former and deactuating or closing the latter. The second pneumatic signal line 51 terminates in a valve chamber 52 which contains a spring biased poppet valve 53. The poppet valve 53 is located adjacent the piston rod 54 of the pneumatic motor 30 to be opened to exhaust the air in the second pneumatic signal line 51 upon the extension of the piston rod 54.

In accordance with the present invention, a pneumatic supply line 55 communicates the pneumatic supply line 48 with the delivery conduit 18 through the screw delivery passage 40 in the piston 36 of the escapement mechanism 24. A pressure regulator 56 is disposed within the pneumatic supply line 55 to reduce the 70 to 110 p.s.i.g. pressure of the air supplied by the pneumatic supply line 48 to a lower pressure within the range of from 10 to 60 p.s.i.g. The pneumatic supply line 55 supplies the lower pressure air to the delivery conduit 18 to transfer the screws 11 deposited therein to a position adjacent the pneumatic screwdriver 10.

The extent of the pressure reduction by the pressure regulator 56 is largely dependent upon such variables as the length of the delivery conduit 18 and the clearance between the screws 11 and the walls of the delivery conduit 18. However, by way of specific example, it has been found that when the pneumatic supply line 48 is carrying air under a pressure of 90 p.s.i.g. it is usually preferable that the pressure regulator 56 reduce this pressure to a lower pressure within the range of 35 to 40 p.s.i.g.

A pneumatic supply line 57 communicates the pneumatic supply line 48 within the delivery conduit 18 through the escapement mechanism 24. The pneumatic supply line 57, however, is connected to the piston chamber 33 in the escapement mechanism 24 such that it must actuate the piston 36 prior to transmitting air to the delivery conduit 18. A control valve 58 is disposed within the pneumatic supply line 57 and is spring actuated or opened to permit the passage of high pressure air from the pneumatic supply line 48 to the piston chamber 33.

The control valves 49 and 58 are operatively connected to the first pneumatic signal line 22 to be actuated and deactuated, respectively, upon the passage of high pressure air through the first pneumatic signal line 22. A check valve 59 is interposed within the first pneumatic signal line 22 adjacent the control valve 49 such that, upon the exhausting of the pneumatic signal line 22, the air that actuated the control valve 49 must pass through a restriction valve 50 before being exhausted. The restriction valve 50 is set to delay the return of the control valve 49 until momentarily after the actuation of the control valve 58. Due to this delay in the return of the control valve 49, a momentary burst or pulse of high pressure air is permitted to pass through the pneumatic supply line 57 into the piston chamber 33 of the escapement mechanism 24. This momentary burst of high pressure air actuates the piston 36 in the piston chamber 33 and then passes into the delivery conduit 18 to urge the screw 11 which has previously been delivered by low pressure air to a position adjacent the pneumatic screwdriver 10 into the screw holding jaws 16 of the pneumatic screwdriver 10.

From the foregoing, it will be seen that in the illustrated embodiment of the present invention, the screws 11 delivered to the delivery conduit 18 by the escapement mechanism 24 are conveyed to a position adjacent the pneumatic screwdriver 10 by low pressure air and then supplied to the screw holding jaws 16 of the pneumatic screwdriver 10 by a pulse of higher pressure air. Thus, it will be seen that the present invention obtains the advantages arising from the use of both low and high pressure air without the disadvantages of either thereof.

The illustrated embodiment of the present invention, more specifically, operates in the following manner. With the pneumatic screwdriver 10 at rest, the screw 11 to be next driven by the screw engaging bit 15 into the workpiece 12 is held by the screw holding jaws 16 of the pneumatic screwdriver 10. The screws 11 to be driven successively after the screw 11 in the screw holding jaws 16 are located in the delivery conduit 18 and the first screw delivery passage 34 of the escapement mechanism 32, as illustrated in FIG. 1.

The engagement of the screw 11 in the screw holding jaws 16 with the workpiece 12 axially moves the screw engaging bit 15 into driven relationship with the pneumatic motor of the pneumatic screwdriver 10. The engagement of the screw holding jaws 16 with the workpiece 12 during the driving of the screw 11, as shown in FIG. 2, urges the screw holding jaws 16 and the delivery conduit 18 from the workpiece 12. This movement of the delivery conduit 18 opens the plunger valve 20 to divert high pressure air to the first pneumatic signal line 22 which actuates the control valve 49 and deactuates the control valve 58 to the exhaust passage 58a. Thus, high pressure air passing through the pneumatic supply line 41 is directed through the pneumatic signal line 51 to actuate the control valve 44 and deactuate the control valve 45. The actuation of the control valve 44 permits high pressure air to flow through the pneumatic supply line 42 to lower the piston of the pneumatic motor 30 and thereby raise the lift member 28 of the screw storage apparatus 23 to deliver screws 11 to the discharge chute 27. This lowering of the piston of the pneumatic motor 30, as was previously described, causes the piston rod 54 to open the poppet valve valve 53 to exhaust the pneumatic signal line 51.

Simultaneously with the beforedescribed operation of the control valves 44 and 45, a portion of the high pressure air passing through the second pneumatic signal line 51 passes into the pneumatic supply line 55 and is reduced in pressure by the pressure regulator 56. Thus, low pressure air is supplied through the pneumatic supply line 55 to the delivery conduit 18 to urge the screw 11 in the delivery conduit 18 to a position adjacent the pneumatic screwdriver 10.

After the pneumatic screwdriver 10 has driven the screw 11 to depth and has been removed from contact with the workpiece 12, as shown in FIG. 3, the delivery conduit 18 slides towards the workpiece 12. This movement of the delivery conduit 18 permits the plunger valve 20 to return and exhaust the first pneumatic signal line 22 through the exhaust passage 60 in the pneumatic screwdriver 10. The control valve 58 returns immediately upon the exhausting of the first pneumatic signal line 22. The return of the control valve 49 is, however, momentarily delayed by the restriction valve 50 such that a pulse of high pressure air passes through the pneumatic supply line 57 into the piston chamber 33 of the escapement mechanism 24. This pulse of high pressure air actuates the piston 36 and then passes through the delivery conduit 18 to urge the screw 11 therein at a position adjacent the pneumatic screwdriver 10 into the jaws 16 of the pneumatic screwdriver 10. The return of the piston 36 gravity feeds the screw 11 in the first screw delivery passage 34 into the delivery conduit 18 preparatory to its being delivered to the pneumatic screwdriver 10 during the succeeding insertion cycle thereof and, also, directs another screw 11 into the first screw delivery passage 34.

The return of the control valve 49, after the beforedescribed pulse of high pressure air, exhausts the second pneumatic signal line 51 to the exhaust passage 49a. This, as will be seen, permits high pressure fluid to pass from the pneumatic supply line 41 to the pneumatic supply line 43 to raise the piston of the pneumatic motor 30 which, in turn, lowers the lift member 28 to receive screws 11 from the storage hopper 26. Thus, the pneumatic screwdriver 10 is ready for the commencement of another insertion cycle.

It is believed to be apparent from the foregoing description that the present invention has provided a new and improved apparatus for applying fastener shaped parts to a pneumatic insertion tool through the use of low pressure fluid to transmit the parts adjacent the insertion tool and then higher pressure air to supply the parts into the insertion tool.

Although but one embodiment of the invention has been illustrated and described in detail, it is to be expressly understood that the invention is not limited thereto. Various changes can be made in the arrangement of parts without departing from the spirit and scope of the present invention as the same will now be understood by those skilled in the art.

Having thus described my invention, I claim:

1. An apparatus for supplying fastener shaped parts to an insertion tool through a delivery conduit operatively connected to said insertion tool and communicating with a source of fastener shaped parts to receive parts from said source of parts, said apparatus comprising:
fluid passage means operatively connected to a source of pressurized fluid and communicating with said delivery conduit for supplying pressurized fluid to said delivery conduit; and
valve means interposed in said fluid passage means for directing fluid at a first pressure to said delivery conduit for transferring parts in said delivery conduit to a position towards said insertion tool and for directing fluid at a second pressure, higher than said first pressure, to said delivery conduit for transferring parts in said position towards said insertion tool into driving relation with said insertion tool.

2. An apparatus for supplying fastener shaped parts to an insertion tool through a delivery conduit operatively connected to said insertion tool and communicating with a source of fastener shaped parts to receive parts from said source of parts, said apparatus comprising:
fluid passage means operatively connected to a source of pressurized fluid and communicating with said delivery conduit for supplying pressurized fluid to said delivery conduit; and
valve means interposed in said fluid passage means for directing fluid at a first pressure to said delivery conduit for transferring parts in said delivery conduit to a position towards said insertion tool and for directing a brief flow of fluid at a second pressure, higher than said first pressure, to said delivery conduit for transferring parts in said position towards said insertion tool into driving relation with said insertion tool.

3. An apparatus according to claim 2 wherein means operatively connect said valve means to said insertion tool such that said valve means directs said fluids to said delivery conduit in timed relationship to the operation of said insertion tool.

4. An apparatus for supplying fastener shaped parts to an insertion tool through a delivery conduit operatively connected to said insertion tool and communicating with a source of fastener shaped parts to receive parts from said source of parts, said apparatus comprising:
fluid passage means operatively connected to a source of pressurized fluid and communicating with said delivery conduit for supplying pressurized fluid to said delivery conduit; and
valve means interposed in said fluid passage means for directing fluid at a first pressure to said delivery conduit for transferring parts in said delivery conduit to a position towards said insertion tool while said insertion tool is driving a previously supplied part and for directing a brief flow of fluid at a second pressure, higher than said first pressure, to said delivery conduit for transferring parts in said position towards said insertion tool into driving relation with said insertion tool after said insertion tool has drven said previously delivered part.

5. An apparatus for supplying fastener shaped parts to an insertion tool through a delivery conduit operatively connected to said insertion tool and communicating with a source of fastener shaped parts to receive parts individually from said source of parts, said apparatus comprising:
fluid passage means operatively connected to a source of pressurized fluid and communicating with said delivery conduit for supplying pressurized fluid to said delivery conduit; and
valve means interposed in said fluid passage means for directing fluid at a first pressure to said delivery conduit for transferring a part in said delivery conduit to a position adjacent said insertion tool and for directing fluid at a second pressure, higher than said first pressure, to said delivery conduit for transferring a part in said position adjacent said insertion tool into driving relation with said insertion tool.

6. An apparatus for supplyng fastener shaped parts to an insertion tool through a delivery conduit operatively connected to said insertion tool and communicating with a source of fastener shaped parts to receive parts individually from said source of parts, said apparatus comprising:

fluid passage means operatively connected to a source of pressurized fluid and communicating with said delivery conduit for supplying pressurized fluid to said delivery conduit; and valve means interposed in said fluid passage means for directing fluid at a first pressure to said delivery conduit for transferring a part in said delivery conduit to a position adjacent said insertion tool and for directing a brief flow of fluid at a second pressure, higher than said first pressure, to said delivery conduit for transferring a part in said position adjacent said insertion tool into driving relation with said insertion tool.

7. An apparatus for supplying fastener shaped parts to an insertion tool through a delivery conduit operatively connected to said insertion tool and communicating with a source of fastener shaped parts to receive parts individually from said source of parts, said apparatus comprising:

fluid passage means operatively connected to a source of pressurized fluid and communicating with said delivery conduit for supplying pressurized fluid to said delivery conduit; and valve means interposed in said fluid passage means for directing fluid at a first pressure to said delivery conduit for transferring a part in said delivery conduit to a position adjacent said insertion tool while said insertion tool is driving a previously delivered part and for directing a brief flow of fluid at a second pressure, higher than said first pressure, to said delivery conduit for transferring a part in said position adjacent said insertion tool into driving relation with said insertion tool after said insertion tool has driven said previously delivered part.

8. An apparatus for supplying fastener shaped parts to an insertion tool through a delivery conduit operatively connected to said insertion tool and communicating with a source of fastener shaped parts to receive parts individually from said source of parts, said apparatus comprising:

fluid passage means operatively connected to a source of pressurized fluid and communicating with said delivery conduit for supplying pressurized fluid to said delivery conduit; and valve means interposed in said fluid passage means for directing fluid at a pressure within the range of from 10 to 60 pounds per square inch gauge pressure to said delivery conduit for transferring a part in said delivery conduit to a position adjacent said insertion tool while said insertion tool is driving a prevously delivered part and for directing a brief flow of fluid at a pressure within the range of from 70 to 110 pounds per square inch gauge pressure to said delivery conduit for transferring a part in said position adjacent said insertion tool into driving relation with said insertion tool after said insertion tool has driven said previously delivered part.

9. An apparatus for supplying fastener shaped parts to an insertion tool through a delivery conduit operatively connected to said insertion tool and communicating with a source of fastener shaped parts to receive parts individually from said source of parts, said apparatus comprising:

a first fluid passage operatively connected to a source of pressurized fluid and communicating with said delivery conduit for supplying pressurized fluid thereto;

first valve means operatively disposed in said first fluid passage for directing fluid under a pressure within the range of from 10 to 60 pounds per square inch gauge to said delivery conduit for transporting a part therein through said delivery conduit to a position adjacent said insertion tool while the latter is driving the last previously delivered part;

a second fluid passage operatively connected to a source of pressurized fluid and communicating with said delivery conduit for supplying presurized fluid thereto; and second valve means operatively disposed in said second fluid passage for directing fluid under a pressure within the range of from 70 to 110 pounds per square inch gauge to said delivery conduit for transporting a part delivered to said position adjacent said insertion tool into driving relation with said insertion tool after the latter has driven the last previously supplied part.

10. An apparatus for supplying fastener shaped parts to an insertion tool through a delivery conduit operatively connected to said insertion tool and communicating with a source of fastener shaped parts to receive parts individually from said source of parts, said apparatus comprising:

a first fluid passage operatively connected to a source of pressurized fluid and communicating with said delivery conduit for supplying pressurized fluid thereto;

first valve means operatively disposed in said first fluid passage for directing fluid under a pressure within the range of from 10 to 60 pounds per square inch gauge to said delivery conduit for transporting a part therein through said delivery conduit to a position adjacent said insertion tool while the latter is driving the last previously delivered part;

a second fluid passage operatively connected to a source of pressurized fluid and communicating with said delivery conduit for supplying pressurized fluid thereto; and second valve means operatively disposed in said second fluid passage for directing a pulse of fluid under a pressure within the range of from 70 to 110 pounds per square inch gauge to said delivery conduit for transporting a part delivered to said position adjacent said insertion tool into driving relation with said insertion tool after the latter has driven the last previously supplied part.

11. An apparatus according to claim 10 wherein said first and second fluid passages are operatively connected to a single source of pressurized fluid, and said first valve means comprises a valve interposed within said first fluid passage for reducing the pressure of the pressurized fluid passing therethrough.

12. An apparatus according to claim 10 wherein a third fluid passage operatively connects said first and second valve means to said insertion tool for actuating said first and second valve means to direct presurized fluid to said insertion tool.

No references cited.

WILLIAM W. DYER, JR., *Primary Examiner.*

R. J. ZLOTNIK, *Assistant Examiner.*